Patented Oct. 14, 1941

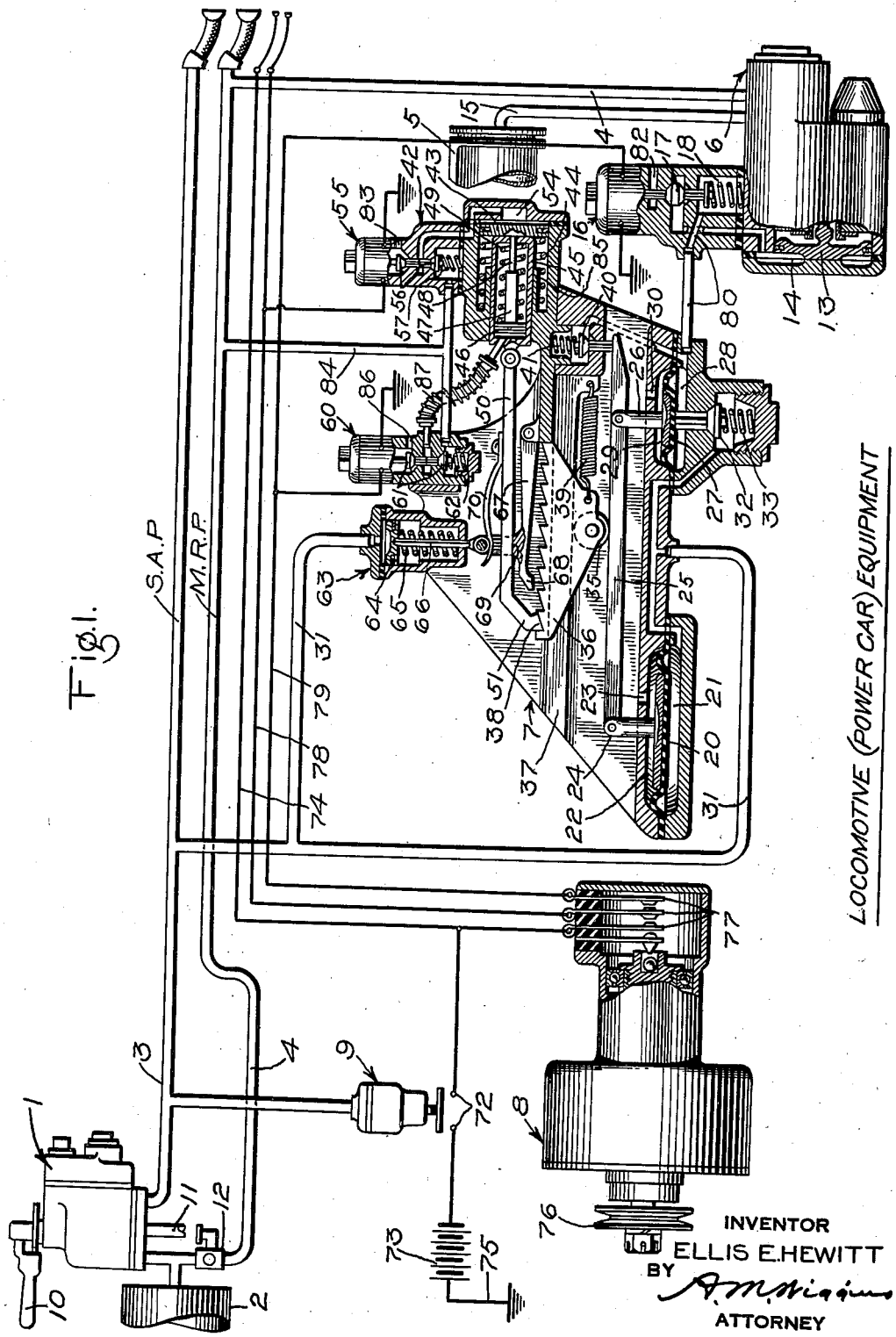

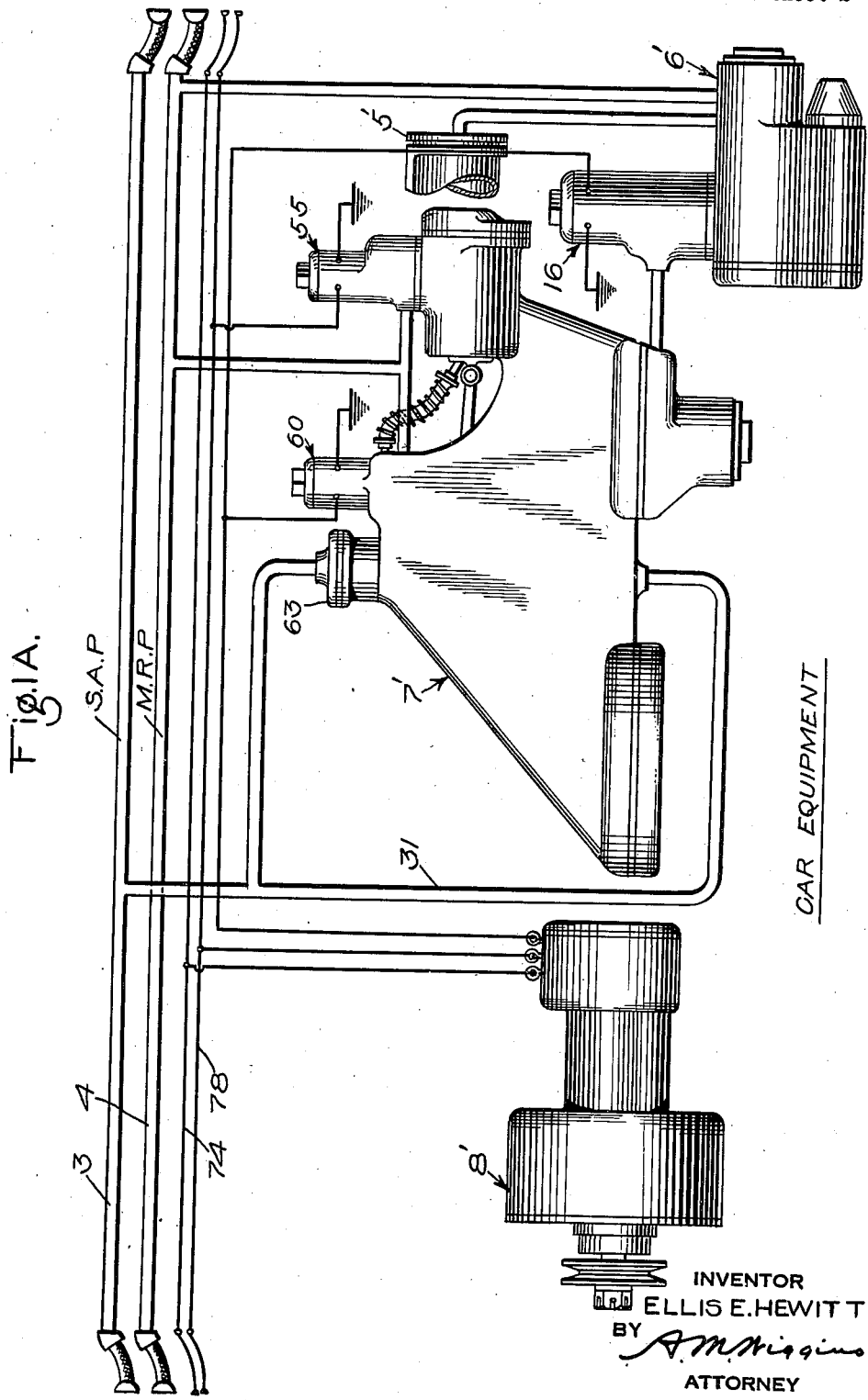

2,258,761

UNITED STATES PATENT OFFICE 2,258,761

BRAKE CONTROL APPARATUS

Ellis E. Hewitt, Edgewood, Pa., assignor to The Westinghouse Air Brake Company, Wilmerding, Pa., a corporation of Pennsylvania Application September 28, 1940, Serial No. 358,746

10 Claims. (Cl. 303—21)

This invention relates to brake control apparatus, and more particularly to apparatus for controlling the brakes on railway vehicles in a manner to prevent sliding of the wheels due to application of the brakes thereon.

It is a matter of common knowledge to those skilled in the art that if the brakes associated with railway vehicle wheels are applied to a degree exceeding that permitted by the adhesion between wheels and rails, the wheels will commence to slip and if the brakes are not released promptly will reach a locked-wheel stage and thus slide. Sliding of the wheels is objectionable not only because it damages the wheels but also because a sliding wheel is less effective than a rolling wheel in producing retardation of the vehicle.

The term "wheel slipping" is generally understood to refer to a wheel which is rolling at a speed less than that corresponding to the speed of the vehicle, and the term "wheel sliding" is generally understood to refer to a wheel which is not rolling at all while the vehicle is in motion. In describing the invention these accepted meanings of these terms are to be understood throughout.

When a wheel begins to slip, if the brakes thereon are promptly released wheel sliding may be avoided and the slipping wheel will return to the speed of non-slipping wheels. An object of the present invention is to provide novel means which will respond in the incipient stage of wheel slipping to initiate a release of the brakes causing the wheels to slip so that said wheels may return to synchronous or non-slipping wheel speed.

A cause of wheel slipping may be bad rail conditions, in which case it is desirable that the force with which the brakes are applied be lower than that employed under good rail conditions. For that reason it has been considered desirable that when the brakes are reapplied on a wheel which has slipped, the degree of reapplication be made lower than the degree of the original application which produced the slipping condition. Another object of the present invention is to provide improved means which will automatically operate to limit the degree of reapplication of the brakes on a wheel which has once slipped during a given brake application period.

The theory has been advanced that if one or more wheels in a train of vehicles should slip, such is an indication that rail traction conditions may not be up to expectations and that consequently the range of degrees to which the brakes throughout the train may be applied should be made lower than under ordinary operating conditions. In accordance with this notion it is a further object of the invention to provide means which will automatically operate to limit the range of degrees to which the brakes throughout the train may be applied when one or more wheels on vehicle have slipped due to application of the brakes.

A yet further object of the invention is to provide a novel brake control apparatus for realizing the aforementioned objects singly and in combination.

The invention has been illustrated in the attached drawings in the form of an air brake equipment for a railway train, in which, Fig. 1 illustrates the brake equipment for the locomotive or power car of the train, and Fig. 1A illustrates the brake equipment for each trailer car in the train.

Detail description

Referring first to the locomotive or power car brake equipment shown in Fig. 1, this equipment comprises a brake valve device 1, a main reservoir 2, a straight air pipe 3, which it will be understood runs throughout the entire length of the train, a main reservoir pipe 4, which also extends throughout the length of the train, a brake cylinder 5, a relay valve device 6, a control mechanism 7, and a wheel slip detector device 8. Also provided in this equipment is a pressure operated switch device 9.

Referring now to the brake equipment on the trailer cars, as shown in Fig. 1A, this equipment comprises an extension of the straight air pipe 3, an extension of the main reservoir pipe 4, a brake cylinder 5', a relay valve device 6', a control mechanism 7', and a wheel slip detector device 8'. The parts bearing the same reference characters as employed in connection with Fig. 1, but with the prime added, are to be understood as being duplicates of the corresponding devices in Fig. 1. It will therefore be necessary to describe in detail only the aparatus shown in Fig. 1.

The brake valve device 1 is preferably of the conventional self-lapping type, that is, the type in which fluid under pressure is supplied from the main reservoir 2 to straight air pipe 3 at a pressure value corresponding to the degree or extent of movement of handle 10 into an application zone. It will be understood that when the handle 10 is in released position the straight air pipe 3 is connected to the atmosphere by way of an exhaust pipe 11.

The main reservoir 2 is to be understood as being maintained charged with fluid under pressure by the usual compressor, not shown. Fluid under pressure is delivered from the main reservoir 2 to the main reservoir pipe 4 by way of a conventional type feed valve device 12, which as is well understood functions to maintain the pressure in pipe 4 at a predetermined value.

The brake cylinder 5 is of conventional design, and while only one such cylinder has been illustrated, as many may be employed on each car as is found desirable.

The relay valve device 6 may be of conventional design, as for example as shown in Patent No. 2,096,491 granted to Ellis E. Hewitt on October 19, 1937. As will be understood from this patent, the relay valve device contains a piston 13 which is subject to fluid under pressure supplied to a chamber 14, and operates upon supply of fluid under pressure to this chamber to in turn supply fluid under pressure from the main reservoir pipe 4 to the brake cylinder 5 and brake cylinder supply pipe 15 to a degree dependent upon the degree of pressure established in chamber 14. It will be understood of course that when the pressure in chamber 14 is atmospheric pressure the relay assumes a position in which it vents the brake cylinder 5 and pipe 15 to the atmosphere.

In carrying out the purposes of the invention I have added to the relay valve device 6 a magnet valve device 16. This device is embodied in a casing having disposed therein a double beat valve 17, which is biased toward an upper seated position by a spring 18, and which is actuated to a lower seated position by an electromagnet therein when energized.

The control mechanism 7 is a mechanism comprised of several component parts, one component part including a diaphragm 20 subject on its lower side to pressure of fluid in a chamber 21 and on its upper side to atmospheric pressure present in a chamber 22 which is always open to the atmosphere by way of port 23. The diaphragm is connected by a stem 24 to one end of a lever 25. The other end of the lever 25 is connected to a stem 26 fastened to a diaphragm 27, which is subject on its lower side to pressure of fluid in a chamber 28 and on its upper side to pressure of fluid in a chamber 29 which is always open to the atmosphere by way of a port 30.

As will be observed from the drawings, the chamber 21 is connected to the straight air pipe 3 by branch pipe 31. Further, the diaphragm 27 is arranged to engage the fluted stem of a supply valve 32, which valve is urged toward seated position by a spring 33.

The control mechanism 7 further comprises a movable fulcrum for the lever 25 in the form of a roller 35. The roller 35 is rotatably secured to a carriage 36 which is slidable on a bar or projection 37 fastened to or integral with the casing of the mechanism 7. The carriage has its upper surface serrated or notched as may be seen at 38. A spring 39 has one end fastened to the carriage 36 and the other end fastened to the frame of the mechanism, so that the spring urges the carriage to a biased position to the right, as will be evident.

The right hand end of the lever 25 engages the fluted stem of a release valve 40, which valve is urged toward a seated position by a spring 41.

Disposed to the upper right of the control mechanism 7 is an adjusting device 42, which includes a cylinder having disposed therein a piston 43 biased to the right by a spring 44. The piston abuts against a slidable sleeve 45 which serves as a stem for the piston. The sleeve 45 is slidable in the supporting casing and is provided with an internal bore forming a cylinder in which a piston 46 is disposed. The piston 46 carries a stem one portion 47 of which is of larger diameter than the other portion 48. The smaller portion 48 slides in an aperture in the right hand end of the sleeve 45. The piston 46 is biased to the left of the bore in the sleeve 45 by spring 49. The sleeve 45 has rotatably secured thereto an adjusting pawl 50, which pawl is so shaped that its extreme end 51 may engage one of the serrations or notches 38 for the purpose of shifting the carriage 36 to the left.

The piston 43 is subject to the pressure of fluid established in a chamber 54, and the supply of fluid under pressure to and the release from this chamber is controlled by a magnet valve device 55. This magnet valve device comprises a double valve arrangement 56 which is biased toward an upper or venting position by a spring 57, and is actuated to a lower or supply position by an electromagnet inside the casing of the device when energized.

For controlling the supply of fluid under pressure to act upon the piston 46, there is provided a further magnet valve device 60. This device also comprises a double valve arrangement 61 which is urged toward an upper or venting position by a spring 62 and is actuated to a lower or supply position an electromagnet in the valve device casing when energized.

For the purpose of locking the carriage in a position to which it has been moved, there is provided a mechanism comprising a cylinder 63 which contains therein a piston 64 urged to an upper position by a spring 65. The piston is actuated downwardly upon supply of fluid under pressure to the pipe 31 to which it is connected. The piston 64 has connected thereto a stem 66 the lower end of which is pivotally connected to a locking pawl 67. This pawl has an end 68 thereof shaped to engage the serrations 38 on the carriage 36, and when so engaged serves to hold the carriage in its adjusted position.

As will be observed, the adjusting pawl 50 passes through an aperture 69 in the locking pawl 67, which aperture is formed to permit vertical movement of the locking pawl relative to the adjusting pawl. A spring 70 attached to the adjusting pawl 50 reacts against the locking pawl to urge the adjusting pawl downwardly with respect thereto.

The pressure operated switch 9 is preferably of conventional design and, as shown, is connected to the straight air pipe 3. The function of this switch is to establish connection between contacts 72 when pressure to a low predetermined degree (as for example five or six pounds) has been established in the straight air pipe 3. This is for the purpose of connecting one terminal of a battery 73 to a train supply conductor 74. It will be observed that the other terminal of the battery 73 is connected to ground at 75.

The wheel slip detector device 8 may be of any convenient design, but I have illustrated the type of design disclosed and claimed in Patent No. 2,140,620, granted December 20, 1938, to Clyde C. Farmer. Briefly stated, this device is embodied in a casing having an inertia mechanism disposed on a shaft to which a pulley 76 is affixed. The pulley 76 is preferably rotatably connected to some part of the vehicle which rotates at wheel speed, as for example a vehicle axle. The device is so constructed that when the speed of the axle or part to which it is connected diminishes at a rate exceeding a chosen rate, the device will actuate to cause engagement of contact members 71. As will be evident from the drawings, if the contacts 72 are connected together the battery 73 will be connected to two conductors 78 and 79. This connection will be maintained so long as the axle or rotating part of the vehicle continues to reduce in speed at a rate above a chosen rate. It will thus be obvious that the device 8 will indicate when a wheel slips, and during the slipping stage will connect conductors 78 and 79 to the battery 73.

Further details of the invention will be best understood from the description of operation of the embodiment illustrated.

Normal brake application

Assuming that the equipment has been charged with fluid under pressure in the customary manner, a brake application may be effected by moving the handle 10 of the brake valve 1 into the application zone. This movement of the handle results in first closing the communication between the straight air pipe and the exhaust pipe 11 and then in supplying fluid under pressure to the straight air pipe from the main reservoir 2 to a degree dependent upon the extent of movement of the handle into the application zone.

Fluid under pressure supplied to the straight air pipe 3 will on the locomotive and each car in the train flow by way of branch pipe 31 to the chamber 21 and cylinder 63 in each control mechanism 7, as well as to switch device 9 on the locomotive.

The pressure established in chamber 21 will act upon diaphragm 20 and cause it to move upwardly from the position shown in Fig. 1. This movement will rock lever 25 about the fulcrum roller 35 and thus actuate diaphragm 27 downwardly. Release valve 40, which was formerly held open due to engagement of the right end of the lever 25 therewith, will be closed by its spring 41, and supply valve 32 will be actuated to unseated position. Fluid under pressure will then flow from the straight air pipe 3 to the relay piston chamber 14, by way of branch pipe 31, past unseated supply valve 32, chamber 28, pipe and passage 80, past now unseated valve 17, and from thence to the relay piston chamber. As a result of this the relay valve device 6 will operate to supply fluid under pressure from the main reservoir pipe 4 to the brake cylinder 5.

The flow to the brake cylinder above described will continue until the pressure acting in chamber 28 below diaphragm 27 is sufficient to actuate the diaphragm upwardly and permit spring 33 to seat supply valve 32, without at the same time unseating release valve 40. Flow to the brake cylinder will then be terminated because as is characteristic of the relay device 6 it will reproduce in brake cylinder 5 a pressure corresponding to that established in the chamber 14.

The pressure in chamber 28 which will produce the lap action just described will bear a relation to the pressure established in chamber 21, and in straight air pipe 3, as determined by the relation of the moment arm of lever 25 to the right of the fulcrum 35 to the moment arm of the lever to the left of the fulcrum, and by the relation between the areas of diaphragms 20 and 27, as will be obvious. It will thus be seen that during a normal brake application the pressure established in the brake cylinder 5 will bear a definite relation to the pressure established in the straight air pipe 3 by the brake valve device 1.

During the brake application, and so long as a low pressure exists in the straight air pipe 3, switch device 9 will maintain contacts 72 connected, and piston 64 in cylinder 63 will hold both locking pawl 67 and adjusting pawl 50 downwardly in engagement with the notches 38. This will insure that carriage 36 will hold the fulcrum roller 35 in the desired position.

In order to release the brakes the brake valve handle 10 is returned to release position, whereupon pressure in the straight air pipe 3 will be reduced to atmospheric pressure by flow to the atmosphere via exhaust pipe 11. The consequent reduction of pressure in chamber 21 will result in the pressure in chamber 28 moving diaphragm 27 upwardly far enough to cause unseating of release valve 40. This will effect consequent venting of the relay chamber 14 which will further result in releasing pressure from the brake cylinder 5.

The brakes of course can be graduated on or off in accordance with the operation just described.

Control during wheel slipping

Assuming now that the brakes have been applied in the manner just described, and that a wheel or wheels to which the wheel slip detector 8 is connected begin to slip, the apparatus will function as follows:

If the slipping wheel or wheels decelerate in speed above a predetermined rate, the wheel slip detector device 8 will cause engagement of the contacts 71. This will result in connecting battery 73 to the two conductors 78 and 79. Conductor 78 extends throughout the train and will cause magnet valve 55 in each control mechanism 7 to be energized. Concurrently, the connection of conductor 79 to the battery will cause magnet valve devices 16 and 60 on the locomotive or power car only to be energized.

Energization of the magnet valve device 16 on the power car will result in actuation of its double beat valve 17 to lower seated position. Chamber 14 will be then closed to supply of fluid under pressure from chamber 28 and will be immediately vented to the atmosphere by way of the open upper seat of the double beat valve and the exhaust port 82. This venting of the chamber 14 takes place rapidly, and will result in rapid release of fluid under pressure from the brake cylinder 5. The purpose of this is to release the brakes as promptly as possible so as to arrest wheel slipping before sliding actually takes place.

Energization of magnet valve device 55 in each control mechanism 7 (on the locomotive as well as on the cars) causes the double valve 56 to be actuated to lower position. This closes the communication from chamber 54 to the atmosphere which formerly existed by way of port 83, and connects chamber 54 to the main reservoir pipe 4 by way of the now open lower seat of double valve 56 and branch pipe 84. Fluid under pressure immediately flows to chamber 54 and actuates piston 43 to the left until it strikes the sleeve element 85. This movement of the piston to the left carries with it the sleeve 45 and consequently the adjusting pawl 50.

Now, as previously described, prior to the movement of the piston 43 just described, both the adjusting pawl 50 and the locking pawl 67 are in engagement with the serrated edges 38 of the carriage 36. Therefore when the sleeve 46 moves to the right it shifts the carriage 36 with it.

Energization of the magnet valve device 60 results in the double valve 61 being shifted to lower seated position, whereupon the communication from the chamber to the left of piston 46 to the atmosphere by way of exhaust port 86, which formerly existed, is closed and fluid under pressure is supplied from the main reservoir pipe and branch pipe 84 to this chamber by way of the flexible conduit 86. The right hand end of the portion 43 of the stem of piston 46 will be in engagement with the piston 43 so that the piston 46 cannot move to the right. However, the sleeve 45 is movable relative to the piston and under the action of fluid pressure moves to the right until the right hand wall of the sleeve strikes the large stem portion 47. This results in shifting the carriage 36 further to the left. By virtue of the movement of carriage 36 just described the fulcrum roller 35 is positioned along the lever 25 to the left of its normal position, and is held there by the locking pawl 67 so long as pressure above a low value is present in the straight air pipe 3.

It will be understood of course that since the magnet valve devices 16 and 60 on the locomotive only are energized the carriage 36 in the control mechanism 7' on the cars is moved only half as far to the left as on the locomotive, it being observed that conductor 78 is the only one which extends throughout the train and is, under the conditions described, connected to the battery 73.

As soon as the slipping condition of the wheel has been arrested, and the wheel has returned to substantially synchronous speed, the wheel slip controller device 8 opens the contacts 77. The magnet valve devices 55 throughout the train, and the magnet valve devices 16 and 60 on the locomotive (or any car on which wheel slipping has taken place), will be deenergized. From the description thus far it will be apparent that the parts of the control mechanism 7 will return to the positions they occupied prior to the wheel slipping incident, with the exception of the carriage 36 which will be retained in its adjusted position by the locking pawl 67.

With the magnet valve device 16 deenergized the relay device 6 will seek to establish in the brake cylinder 5 a pressure corresponding to that in relay chamber 14. But assuming that no change has taken place in the pressure in straight air pipe 3 the pressure in relay chamber 14 will now be different. On the locomotive (where it was assumed wheel slipping occurred) the pressure in relay chamber 14 will be reduced to a lower value than existed before the wheel slipping incident occurred because the fulcrum 35 has now been shifted considerably to the left and, as will be obvious, a lower pressure in chambers 14 and 28 will be required to balance the initially established pressure in chamber 21.

On the cars (where it was assumed that wheel slipping did not occur) the pressure in relay chamber 14 will not be reduced as much as on the locomotive because the fulcrum 35 was not shifted as far to the left as on the locomotive.

From the foregoing it will be obvious that the equipment disclosed provides that on any vehicle on which wheel slipping takes place the apparatus on each car is conditioned to first release the brakes (to cure the wheel slipping condition) and to then permit reapplication of the brakes at a lower value than existed before the wheel slipping incident. On the cars on which wheel slipping actually occurred the limit of reapplication is made lower than on other cars. Thus the liability of a recurrence of wheel slipping on the same car, or the occurrence of wheel slipping on other cars, will be greatly minimized.

I have illustrated and described my invention in connection with an air brake system, because that type of brake is at present a standard form of brake for railway vehicles, but it will be understood that the principle of the invention may be adapted to other forms of brakes. Therefore I do not wish to limit my invention to the details of the particular embodiment shown but embrace within its scope the various forms included within the spirit and terms of the appended claims.

Having now described my invention, what I claim as new and desire to secure by Letters Patent is:

1. In a brake system for a train of vehicles, in combination, a pipe extending throughout the train and being arranged to have selected pressures established therein, control means on each vehicle in the train for effecting an application of the brakes in accordance with the pressure established in said pipe, adjusting means associated with each control means for changing the relationship between the degree of application of the brakes and the pressure in said pipe, a wheel slip detector device associated with each vehicle for detecting slipping of vehicle wheels, and means relating said detector devices and said adjusting means whereby a single detector device on a vehicle having wheel slipping controls the adjusting means on that vehicle in one manner and controls the adjusting means on vehicles having no slipping wheels in a different manner.

2. In a train brake system for a train of vehicles, in combination, brake applying means on each vehicle, a train pipe to which fluid under pressure is supplied to selected degrees, means responsive to the degree of pressure established in said pipe for causing said brake applying means to apply the brakes to a proportionate degree, a first adjusting means for adjusting the relationship between the degree of brake application and the degree of pressure in said pipe, a second adjusting means for further adjusting the relationship between the degree of brake application and the degree of pressure in said pipe, a wheel slip detector device on each vehicle, and means relating said wheel slip detector devices to said first and second adjusting means in a manner such that a wheel slip detector device operating in response to wheel slipping on a given vehicle operates both the first and second adjusting means on that vehicle, and operates only the said first adjusting means on all other vehicles in the train.

3. In a brake system for a train of vehicles, in combination, a train pipe in which pressure is established to a chosen degree to effect an application of the brakes, a mechanism on each vehicle for applying the brakes to a degree proportional to the chosen pressure in said pipe, an adjusting mechanism for changing the relationship between the degree of brake application and the degree of pressure in said pipe, means responsive to slipping of a vehicle wheel on one vehicle for actuating the adjusting means on that vehicle to vary the relation between the degree of brake application and the pressure in said pipe in one ratio, and operative to actuate the adjusting means on all other vehicles to vary the relation between the degree of brake application and the pressure in said pipe in a different ratio.

4. In a vehicle brake system, in combination, a brake cylinder, a pipe in which pressure is established to effect an application of the brakes, means including a positionable element for establishing in the brake cylinder a pressure bearing a relation to the pressure in said pipe according to the position of said element, a first adjusting means operative to move said element to one degree, a second adjusting means operative to move said element to a further degree, and a wheel slip detector device for controlling said two adjusting means.

5. In a vehicle brake system, in combination, a pipe in which pressure to a chosen degree is establishable to initiate an application of the brakes, means for effecting an application of the brakes to a degree proportional to the degree of pressure established in said pipe, means including an element movable to different positions to vary the proportionality between the degree of application of the brakes and the degree of pressure in said pipe, electro-responsive means for shifting said element to a plurality of positions, and locking means responsive to the pressure in said pipe for locking said element in any one of said positions.

6. In a vehicle brake system, in combination, a pipe in which pressure is established to initiate an application of the brakes, a brake cylinder, means for establishing in said brake cylinder a pressure proportional to that established in said pipe, means including an element movable from a biased position to a plurality of other positions for varying the ratio between brake cylinder pressure and that established in said pipe, a wheel slip detector device, means controlled by wheel slip detector device for controlling movement of said element to said plurality of positions, and locking means responsive to the pressure in said pipe for locking said element in any position to which it is moved.

7. In a brake system for a train of vehicles, in combination, a train pipe to which fluid under pressure is supplied to a chosen degree to initiate an application of the brakes, brake applying means on each vehicle, means on each vehicle for causing said brake applying means to produce an application of the brakes to a degree proportional to the degree of pressure established in said pipe, a train electrical conductor, a local electrical conductor on each vehicle, means responsive to energization of said train conductor for changing the ratio between the degree of application of the brakes throughout the train and the pressure in said pipe, means on each vehicle responsive to energization of the local conductor on that vehicle for further changing the ratio between the degree of the application of the brakes on that vehicle and the pressure in said pipe, and a wheel slip detector device on each vehicle operable upon slipping of a wheel on that vehicle to energize both said train conductor and the local conductor on that vehicle.

8. In a brake system for a train of vehicles, in combination, a train pipe to which fluid under pressure is supplied to initiate an application of the brakes throughout the train, at least one brake cylinder on each vehicle for applying the brakes, a control mechanism on each vehicle for establishing in each brake cylinder a pressure proportional to the pressure established in said train pipe, said control means including an element movable to different positions to change the ratio between brake cylinder pressure and the pressure in said train pipe, a wheel slip detector device on each vehicle in the train, means on each vehicle operated in response to a wheel slip operation of the wheel slip detector device on that vehicle for promptly releasing fluid under pressure from the brake cylinder on that vehicle, and for resupplying fluid under pressure to the brake cylinder upon cessation of wheel slipping on that vehicle, means responsive to the same operation of said wheel slip detector device for positioning said element on said vehicle to change the ratio between brake cylinder pressure on the said one vehicle and that in said train pipe to one degree, and means on each vehicle responsive to the same operation of said one wheel slip detector device for changing the ratio between brake cylinder pressure on all other vehicles and the pressure in said pipe to a different degree.

9. In a vehicle brake system, in combination, a brake cylinder, a pipe to which fluid under pressure is supplied to initiate an application of the brakes, means including a beam having a movable fulcrum for establishing in the brake cylinder a pressure bearing a relation to the pressure in said pipe according to the position of said fulcrum, means for effecting a release of the brakes upon slipping of a vehicle wheel due to application of the brakes, and for reapplying the brakes when the wheel slipping condition has substantially ceased, and means operable automatically in response to the wheel slipping condition for positioning said movable fulcrum so that the pressure reestablished in the brake cylinder following wheel slipping bears a different ratio to the pressure in said pipe than did the initial brake cylinder pressure which produced the wheel slipping condition.

10. In a brake system for a train of vehicles, in combination, a straight air pipe arranged to extend throughout the train and to have fluid under pressure supplied thereto to initiate an application of the brakes, at least one brake cylinder on each vehicle in the train, means on each vehicle for establishing in each brake cylinder a pressure proportional to the pressure established in said pipe, an electrically operated valve means on each vehicle for effecting a release of fluid under pressure from the brake cylinder independently of variation of pressure in said pipe, and for also effecting a resupply of fluid under pressure to said brake cylinder, adjusting means on each vehicle for varying the ratio between brake cylinder pressure and the pressure in said pipe, and a device on each vehicle responsive to slipping of a vehicle wheel or wheels due to application of the brakes for controlling the electrically operated valve device on the same vehicle and the adjusting means on all vehicles.

ELLIS E. HEWITT.